United States Patent
Krishnamoorthy et al.

(10) Patent No.: US 9,073,570 B2
(45) Date of Patent: Jul. 7, 2015

(54) ARMATURE FOR A STEERING WHEEL AND METHOD OF MAKING

(75) Inventors: Narasimhan Krishnamoorthy, Bangalore (IN); Ankit Kumar Garg, Bangalore (IN); Subrata Nayak, Bangalore (IN)

(73) Assignee: SABIC GLOBAL TECHNOLOGIES B.V. (NL)

( * ) Notice: Subject to any disclaimer, the term of this patent is extended or adjusted under 35 U.S.C. 154(b) by 135 days.

(21) Appl. No.: 13/440,667

(22) Filed: Apr. 5, 2012

(65) Prior Publication Data

US 2013/0263691 A1 Oct. 10, 2013

(51) Int. Cl.
*B62D 1/04* (2006.01)
*B62D 1/06* (2006.01)

(52) U.S. Cl.
CPC ............ *B62D 1/06* (2013.01); *Y10T 74/20834* (2015.01); *B62D 1/04* (2013.01)

(58) Field of Classification Search
CPC ............ B62D 1/06; B62D 1/046; B62D 1/04; B62D 1/065; Y10T 74/2087; Y10T 74/20876; Y10T 74/20834; Y10T 74/20864
USPC .............. 74/552, 558, 558.5, 557; 29/894.31; 264/248; 156/272.4, 275.1; 403/344
See application file for complete search history.

(56) References Cited

U.S. PATENT DOCUMENTS

| | | | |
|---|---|---|---|
| 3,394,615 A | 7/1968 | Brueder | |
| 6,048,599 A * | 4/2000 | Chu et al. | 428/114 |
| 6,668,682 B1 * | 12/2003 | Emeneth et al. | 74/552 |
| 6,874,386 B2 | 4/2005 | Xu et al. | |
| 7,226,234 B2 * | 6/2007 | Gordy et al. | 403/344 |
| 7,597,028 B2 | 10/2009 | Stoll | |
| 2003/0121360 A1 * | 7/2003 | Hussy | 74/558 |
| 2006/0236807 A1 * | 10/2006 | Yasuda et al. | 74/552 |
| 2007/0017317 A1 | 1/2007 | Cortina et al. | |
| 2007/0068334 A1 | 3/2007 | Stoll | |
| 2008/0277908 A1 * | 11/2008 | White et al. | 280/731 |
| 2009/0007721 A1 | 1/2009 | Cortina et al. | |
| 2009/0314128 A1 | 12/2009 | Rick | |

FOREIGN PATENT DOCUMENTS

| | | | |
|---|---|---|---|
| JP | 2000038139 A * | 2/2000 | B62D 1/04 |
| JP | 2010120551 A | 6/2010 | |

(Continued)

OTHER PUBLICATIONS

Machine Translation of JP 2000-38139.*

(Continued)

*Primary Examiner* — Marcus Charles
*Assistant Examiner* — Yamilka Pinero Medina
(74) *Attorney, Agent, or Firm* — Cantor Colburn LLP

(57) ABSTRACT

In an embodiment, a steering wheel can comprise: a plastic top armature portion comprising a top rim portion and a top spoke portion, the top spoke portion extending radially inward from the top rim portion; and a plastic bottom armature portion comprising a hub, a bottom rim portion, and a bottom spoke portion, the bottom spoke portion extending radially inward to the hub. The top armature portion can be attached to the bottom armature portion with a plurality of snap mechanisms, wherein each snap mechanism comprises a snap fit protrusion that engages an aperture. The armature can be configured to attach to a vehicle steering column.

19 Claims, 16 Drawing Sheets

(56) References Cited

FOREIGN PATENT DOCUMENTS

WO        9965740 A1   12/1999
WO    2007025273 A1   3/2007

OTHER PUBLICATIONS

Japanese Patent No. 2010120551 (A); Publication Date: Jun. 3, 2010; Abstract Only, 1 Page.

International Search Report; International Application No. PCT/IB2012/056901; International Filing Date: Dec. 2, 2012; Date of Mailing: Feb. 26, 2013; 4 Pages.

Written Opinion of the International Searching Authority; International Application No. PCT/IB2012/056901; International Filing Date: Dec. 2, 2012; Date of Mailing: Feb. 26, 2013; 7 Pages.

* cited by examiner though the disadvantages of metal armatures include heavy weight and high mass moment of inertia.

ARMATURE FOR A STEERING WHEEL AND METHOD OF MAKING

BACKGROUND

The present disclosure relates generally to steering wheels, and especially to an armature for a steering wheel and method of making the armature.

Steering wheels often include a metal armature that forms the spokes and rim of the steering wheel. The metal armature is then encapsulated by an appropriate covering material, such as wood or elastomeric material. However, disadvantages of metal armatures include heavy weight and high mass moment of inertia.

Accordingly, alternatives to metal armatures are desired. U.S. Pat. No. 7,597,028 discloses an integrally molded composite steering wheel. Despite these advances, however, there continues to be a need for lightweight, high strength steering wheel assemblies, especially armatures for automotive steering wheels.

BRIEF DESCRIPTION

Disclosed, in various embodiments, are armatures and steering wheels, and methods of making such articles.

In an embodiment, a steering wheel can comprise: a plastic top armature portion comprising a top rim portion and a top spoke portion, the top spoke portion extending radially inward from the top rim portion; and a plastic bottom armature portion comprising a hub, a bottom rim portion, and a bottom spoke portion, the bottom spoke portion extending radially inward to the hub. The top armature portion can be attached to the bottom armature portion with a plurality of snap mechanisms, wherein each snap mechanism comprises a snap fit protrusion that engages an aperture. The armature can be configured to attach to a vehicle steering column.

In an embodiment, a method of making an armature comprises: injection molding a plastic top armature portion comprising a top rim portion and a top spoke portion, the top spoke portion extending radially inward from the top rim portion; injection molding a plastic bottom armature portion comprising a hub, a bottom rim portion, and a bottom spoke portion, the bottom spoke portion extending radially inward from the bottom rim portion to the hub; and assembling the top rim portion and the bottom rim portion together with a plurality of snap mechanisms, wherein each snap mechanism comprises a snap fit protrusion that engages an aperture. The armature is configured to attach to a vehicle steering column via the hub.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
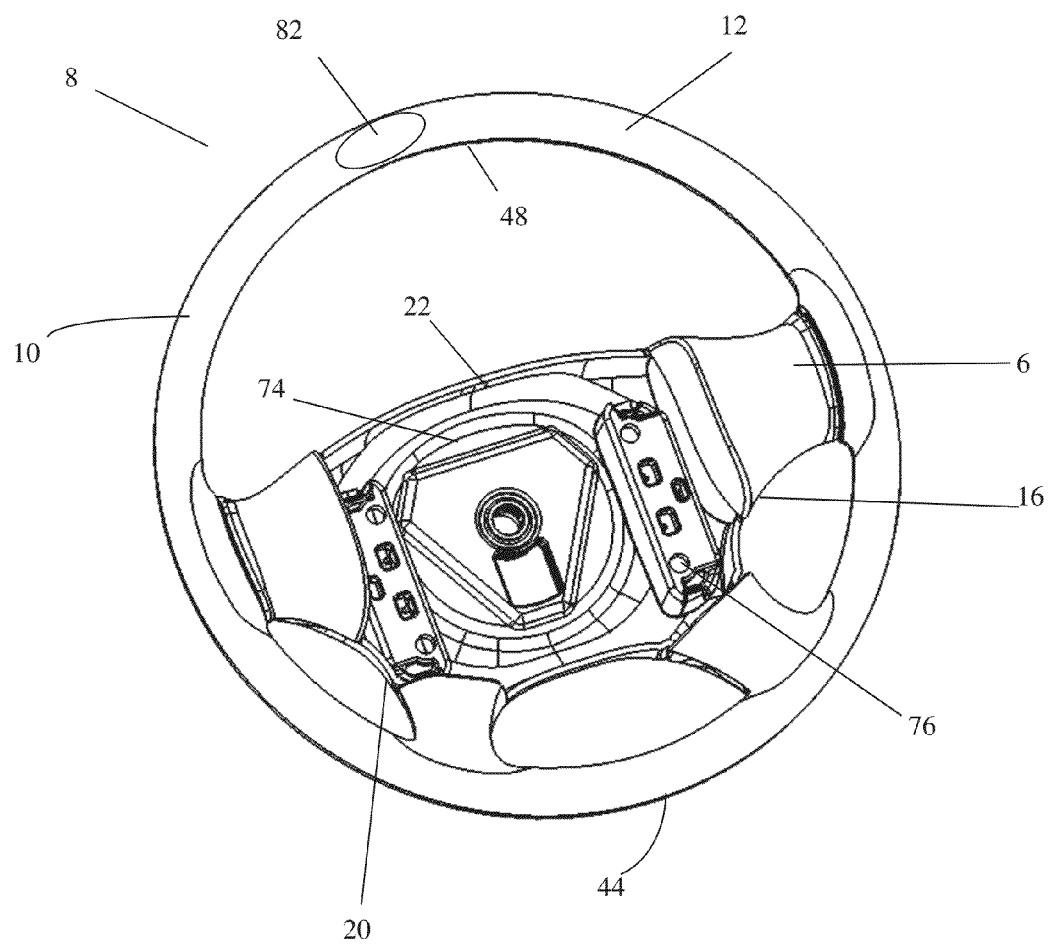
FIG. 1 is a front perspective view of an embodiment of an armature.

It has been determined that a two piece thermoplastic construction for an armature design can provide a higher specific strength than a one piece thermoplastic construction. However, if vibration welding is used to join, for example, two halves of an armature, this can add additional steps to the manufacturing process, thereby increasing manufacturing time and cost. Achieving effective weld strength over time also is a challenge.

It has been determined that employing an armature construction comprising a joining mechanism, wherein the portions of the armature snap fit together can address the above problems. The halves of the armature comprise mating snap mechanisms, desirably oriented in an alternating manner (e.g., wherein the mechanisms can alternate from the outer side to the inner side so that a snap mechanism on the inner side is not adjacent a snap mechanism on the outer side), and wherein each armature half can comprise snap protrusion(s) and/or aperture(s) for receiving a snap protrusion. For example, a plurality of snap fit protrusions on one portion of an armature, such as on one half of the armature, can mate with respective opening(s) to receive the snap fit protrusions located on the other portion, such as on the other half of the armature. This connection mechanism can eliminate the need for vibration welding by providing a counter acting snapping/locking mechanism which locks the two portions together upon joining. Such counter acting snap fit protrusions can provide effective strength over time and one time snap-in joining.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1 is a schematic illustration of an armature 8 for a steering wheel in accordance with embodiments. Armature 8 can comprise a top armature portion 6 comprising a top rim portion 12 and a top spoke portion 16 extending radially inward from the top rim portion 12. The bottom armature portion 4 can comprise a bottom rim portion 14, a bottom spoke portion 20, and a hub 22. The bottom spoke 20 can extend radially inward from the bottom rim portion 14 and the bottom rim portion 14 can be spaced radially outward from and surround the hub 22. The top rim portion 12 and bottom rim portion 14 can mate to form rim 10 upon assembly, as illustrated in FIGS. 2B, 2C, 4, 6A, and 6B.

Figure 8:
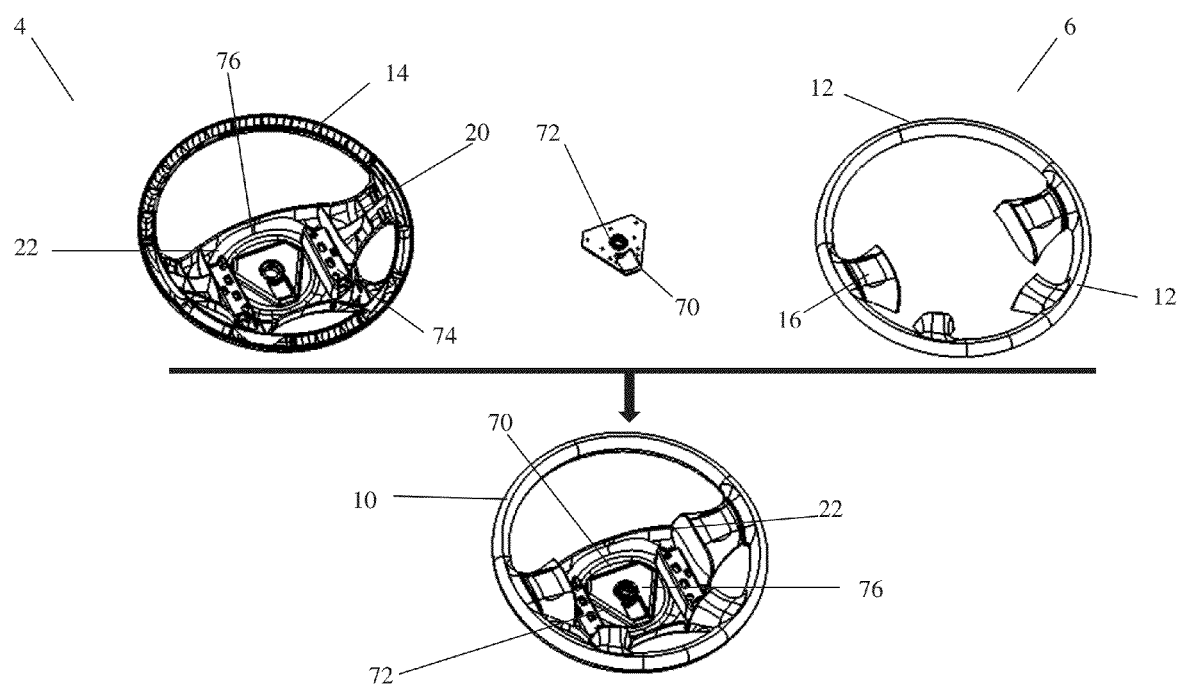
FIG. 8 is a schematic view of an assembly of a bottom armature portion and a top armature portion with use of a metal insert.

The top spoke portion 16 can be integrally molded with the top rim portion 12. The bottom spoke portion 20 (e.g., as can be seen in FIG. 8) and top spoke portion 16 are designed to mate, as shown in FIG. 1 upon assembly of the armature 8. Accordingly, although FIGS. 1 and 8 depict four bottom spokes, more or less bottom spokes can be employed.

Figure 2A:
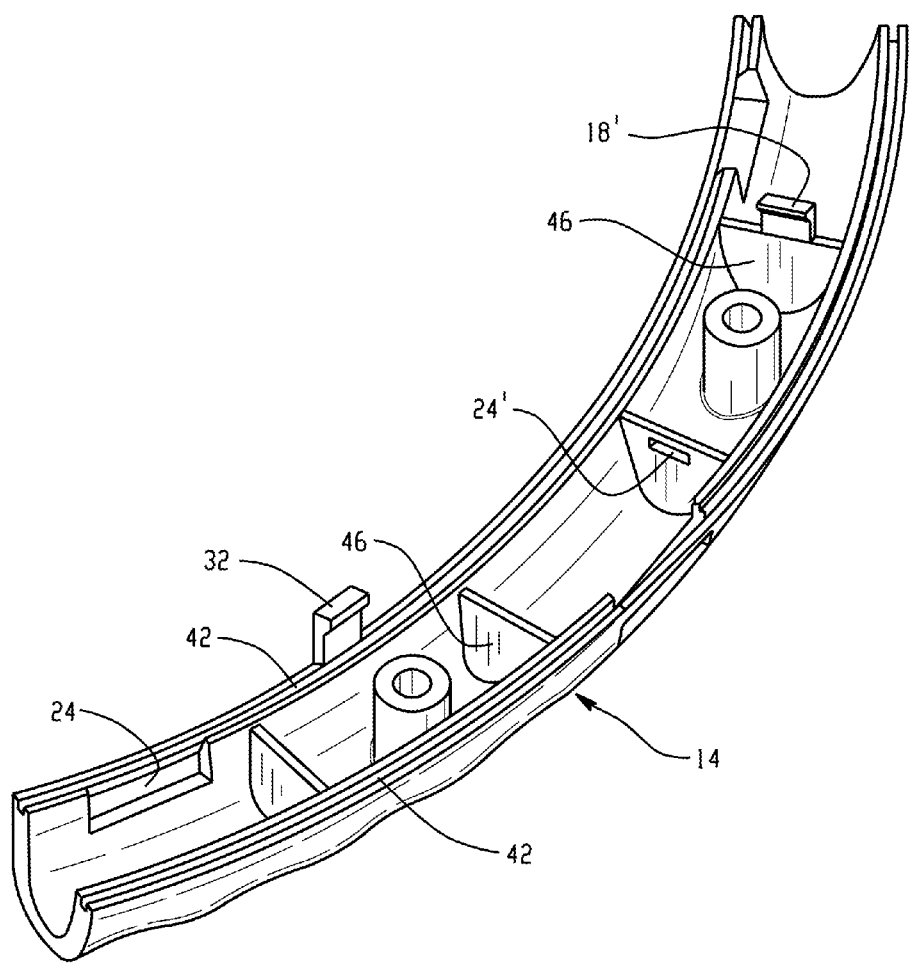
FIG. 2A is a perspective view of a portion of a bottom rim portion of the armature of FIG. 1.
Figure 2B:
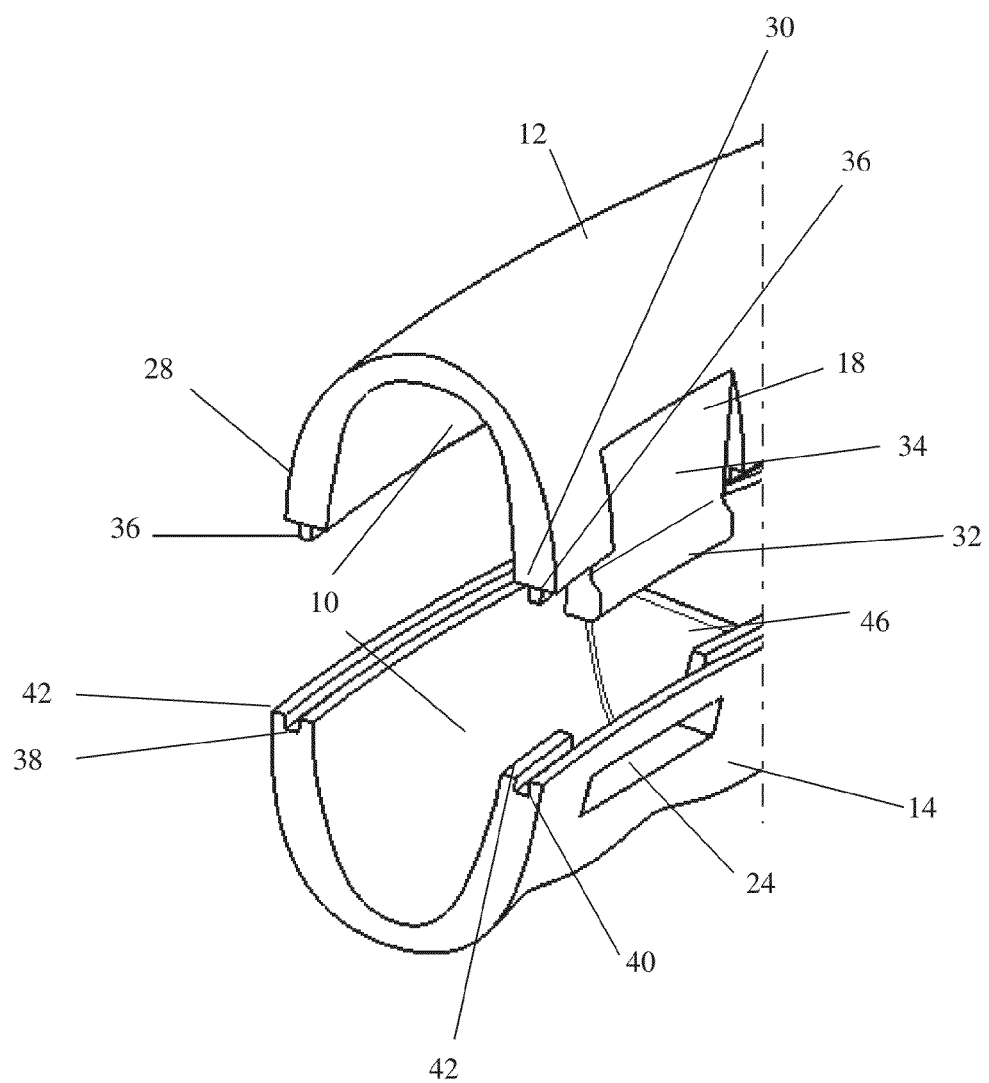
FIG. 2B is a perspective view of a portion of a top rim portion and a portion of a bottom rim portion of FIG. 1, unassembled yet aligned with each other.
Figure 2C:
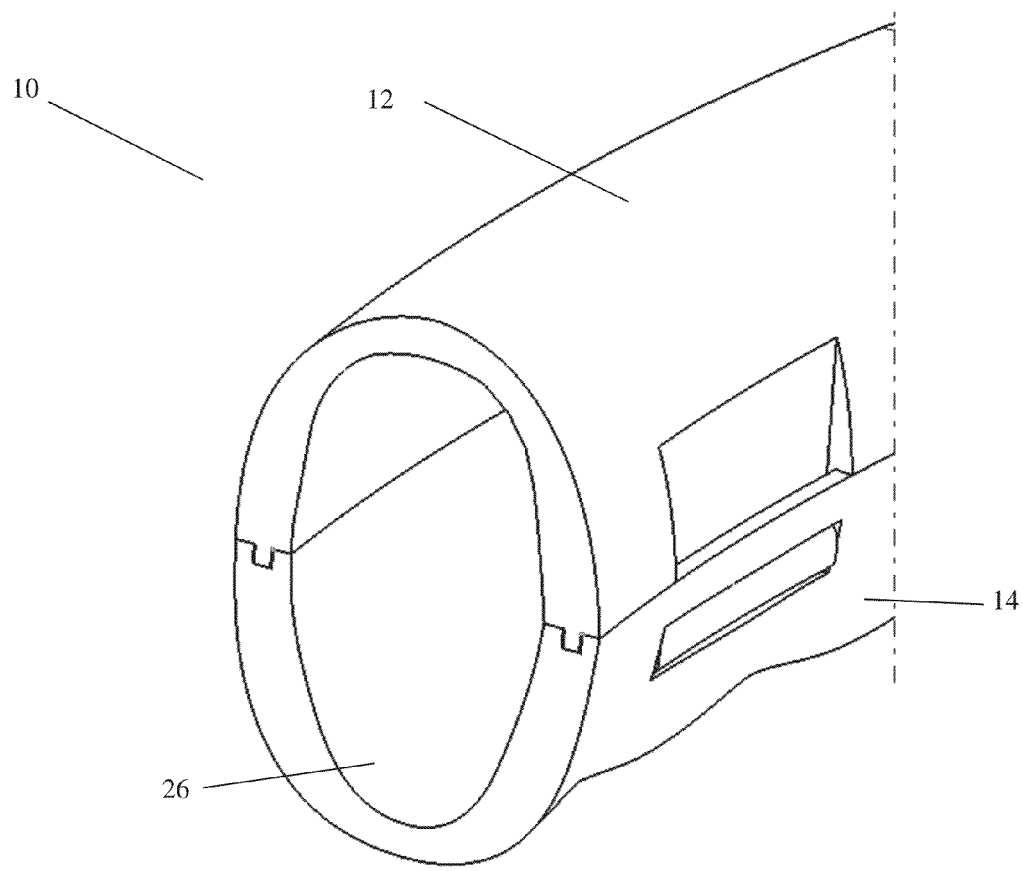
FIG. 2C is a perspective view of FIG. 2B in assembled form.

As shown in FIGS. 2A, 2B, and 2C, the bottom rim portion 14 can comprise aperture(s) (e.g., slots) 24 configured to receive snap fit protrusion(s) 18 of the top rim portion 12. The snap design itself of aperture(s) 24/protrusion(s) (e.g., tang(s)) 18 can be various mating arrangements where an opening on one rim portion is sized and shaped to receive a protrusion on the opposite rim portion in a snap manner, thereby inhibiting disassembly. Thus, the geometry of the aperture(s) and protrusion(s) can be various polygonal and/or rounded shapes, including elongated (e.g., rectangular, oblong, etc.), square, and so forth. Desirably, the protrusion(s) have a lip 32 that can engage (e.g., physically contact), a wall within the opening, and/or the lip 32 can have a sufficient length to extend through the opening 24 and contact the side of the rim (inside or outside, depending from which side the lip 32 enters the opening 24).

The protrusion 18 and aperture 24 can be aligned opposite each other as shown in FIGS. 2B and 2C to join together upon assembly of rim 10. Accordingly, upon assembly of the top rim portion 12 and the bottom rim portion 14 to form rim 10, as depicted in FIG. 2C, a positive locking can be obtained between the snap fit protrusion 18 and aperture 24 (e.g., matching open window portion), which can avoid disassembly once the rim 10 is assembled.

The top rim portion 12 can comprise a first perimeter edge 28 and a second perimeter edge 30, as shown in FIG. 2B, at which a plurality of spaced apart snap fit protrusions 18 can be located. It is noted that the protrusions 18 can be spaced apart at any suitable distance. As an example, protrusions 18 can be spaced apart approximately 45 degrees from each other as measured from the center of the armature 8. However, other spacing also can be employed. Optionally, the snap mechanisms (e.g., comprising the protrusion 18 and the aperture 24) can be located equidistant around the armature.

Any number of snap mechanisms can be arranged around the armature, e.g., to attain a secure attachment of the two rim portions. Generally, located along the outer side (see 44 in FIG. 1) can be greater than or equal to 4 snap mechanisms, specifically, greater than or equal to 8, more specifically, greater than or equal to 10, and yet more specifically, greater than or equal to 12, while in some embodiments, greater than or equal to 15 snap mechanisms can be located about the outer side of the armature. Also, along the inner side (see 48 in FIG. 1) of the armature can be greater than or equal to 4 snap mechanisms, specifically, greater than or equal to 8, more specifically, greater than or equal to 10, and yet more specifically, greater than or equal to 12, while in some embodiments, greater than or equal to 15 snap mechanisms can be located about the inner side of the armature. Optionally, a different number of snap mechanisms can be employed along the outer side and the inner side of the armature. The snap mechanisms can be located along the armature, in a staggered fashion, alternating between inner side and outer side. Alternatively, the snap mechanisms can all be located on the inner side or the outer side of the armature, e.g., all of the snap mechanisms on the armature can be located on the same side of the rim.

The snap fit protrusion 18 can comprise a lip 32 extending from an arm 34, as shown in FIG. 2B for securing into aperture 24. Although the lip 32 and arm 34 are shown as being horizontally oriented in FIG. 2B with respect to the rim 10 to lock into aperture 24, other suitably oriented, shaped, and sized snap fit protrusions 18 configured to lock (e.g., snap) with apertures 24 can be employed. Arm 34 has a sufficient length to enable, during assembly of the armature portions together, the arm to flex, moving and allowing the lip 32 to move along the other portion and to snap into the aperture 24. The length of the arm is dependent upon the location of the aperture 24 and is sufficient to allow the snap, mating engagement. The width of the lip is less than or equal to the width of the aperture 24 to enable the locking of the protrusion 18 into the aperture 24. If the protrusion is located within the channel 26 such that the lip 32 will extend from inside an armature portion to an outside of the armature portion (i.e., away from the channel 26), then, desirably, the lip 32 extends from at or near the base of the protrusion 18 by less than or equal to the depth of the aperture 24 such that when the rim portions are assembled together, the lip 32 does not extend beyond the outer surface of the aperture (e.g., the lip is flush with the outer surface). If the protrusion is located outside the channel 26 such that the lip 32 will extend from outside an armature portion toward the channel 26, then, the lip 32 can extend any desirable distance and can optionally include an extension that can engage the inside surface of the armature, within the channel.

In the illustrated embodiments, the lip 32 protrudes outward, away from the channel 26. Alternatively, or in addition, protrusions 18 can be designed such that the lip extends inward, toward the channel 26. In an embodiment where some or all of the snap mechanisms comprise protrusions having inward extending lips, the aperture can be located on an inward wall of the opposite rim portion such that, when the protrusion is assembled with the aperture, the protrusion does not extend beyond the outer wall of the rim portion (e.g., the protrusion is flush with the outer wall of the rim portion and the lip extends into and optionally through the aperture toward the channel 26.

Alternatively, or additionally, snap mechanism(s) can be employed within a central part of the rim, e.g., in the channel 26, such as in conjunction with the strengthening elements 46. For example, as is shown in FIG. 2A, the element(s) 46 can optionally further comprise an aperture 24' or a snap fit protrusion 18'. These aperture(s) 24' and protrusion(s) 18' would engage protrusion(s) and aperture(s), respectively, on an opposite rim portion.

The rim portions can also optionally comprise mating insertion element(s) and/or groove(s), for example, to further enhance the alignment of the rim portions. For example, the first perimeter edge 28 and second perimeter edge 30 of the top rim portion 12 can each comprise an insertion element 36 which can extend along the length of the perimeter edges 28, 30, e.g., along the entire length except where the snap fit protrusions 18 are located. Similarly, the bottom rim portion 14 can comprise a first perimeter edge 38 (inner perimeter edge) and a second perimeter edge 40 (outer perimeter edge). Between the perimeter edges 38, 40 can be a groove 42 configured to receive the insertion element 36. The groove 42 also can extend the entire length of the bottom rim portion 14 except where slots 24 are located, as shown in FIG. 2B. The insertion element 36 and groove 42 can facilitate the mechanical joining and locking of the top rim portion 12 and bottom rim portion 14, as shown in FIG. 2C, to form the assembled rim 10. It is again understood that the insertion element can be located on one of the rim portions while the groove is on the other rim portion accordingly.

Assembled rim 10 can comprise channel 26, which can be at least partially hollow and can comprise a plurality of strengthening elements 46. Strengthening elements 46, which can be located on the top rim portion and/or bottom rim portion, and which can align with strengthening elements on the other rim portion or can be located between strengthening elements on the other rim portion. The strengthening elements, e.g., ribs, can comprise various shaped and sized elements and be located on the internal sides of either or both rim portions 12, 14. For example, strengthening elements 46 can include a plurality of spaced apart ribs and/or other protrusions that extend across the portion, from one side to the other side, e.g., across the channel 26.

Figure 3:
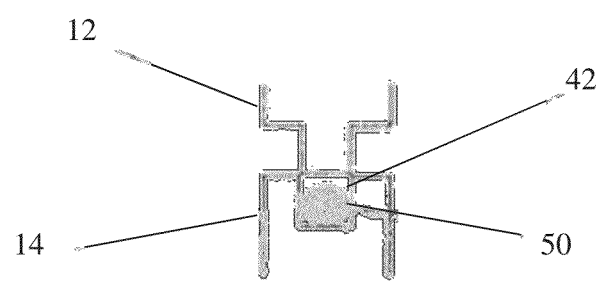
FIG. 3 is a schematic view of an embodiment comprising the use of an adhesive to join the top rim portion and the bottom rim portion together.

Referring to FIG. 3, the rim portions can be further secured together by disposing a material into groove 42. For example, an adhesive 50 such as glue or another bonding agent, can be deposited in groove 42 to further assist in strengthening the assembly of armature.

Figure 4:
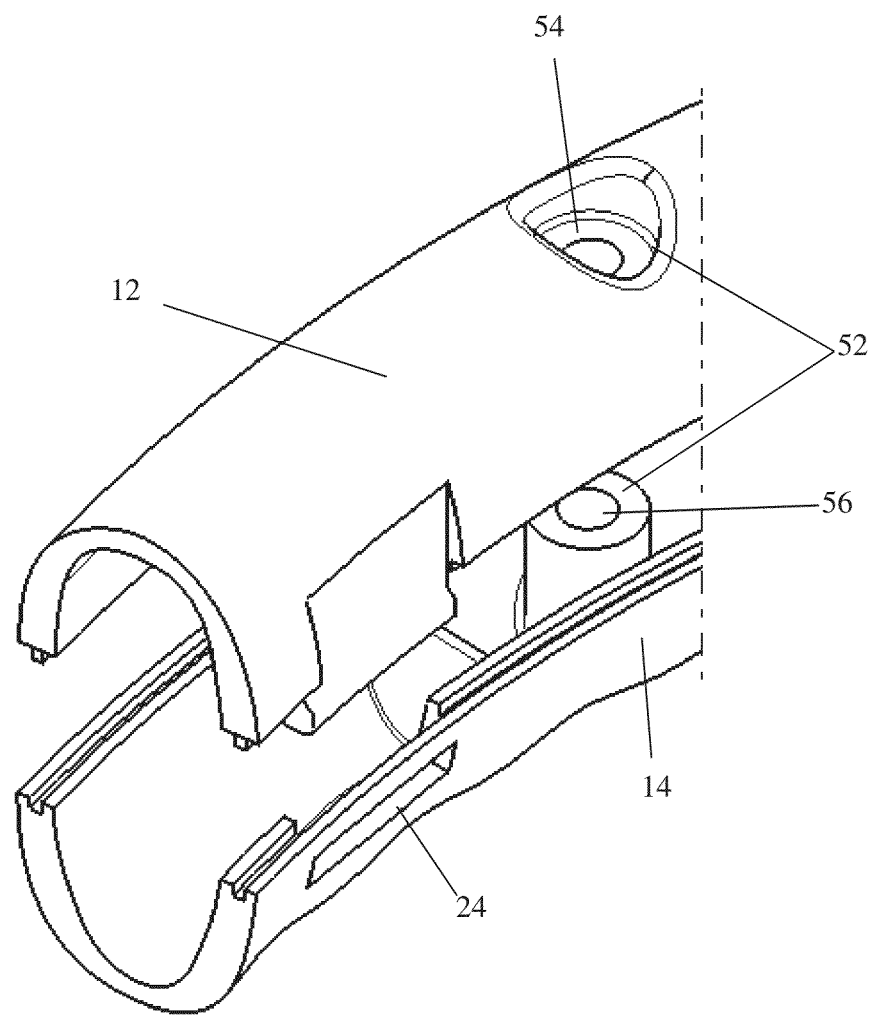
FIG. 4 is a perspective view of a portion of an exemplary rim comprising a mechanical fastening mechanism including a boss and bore combination.
Figure 5:
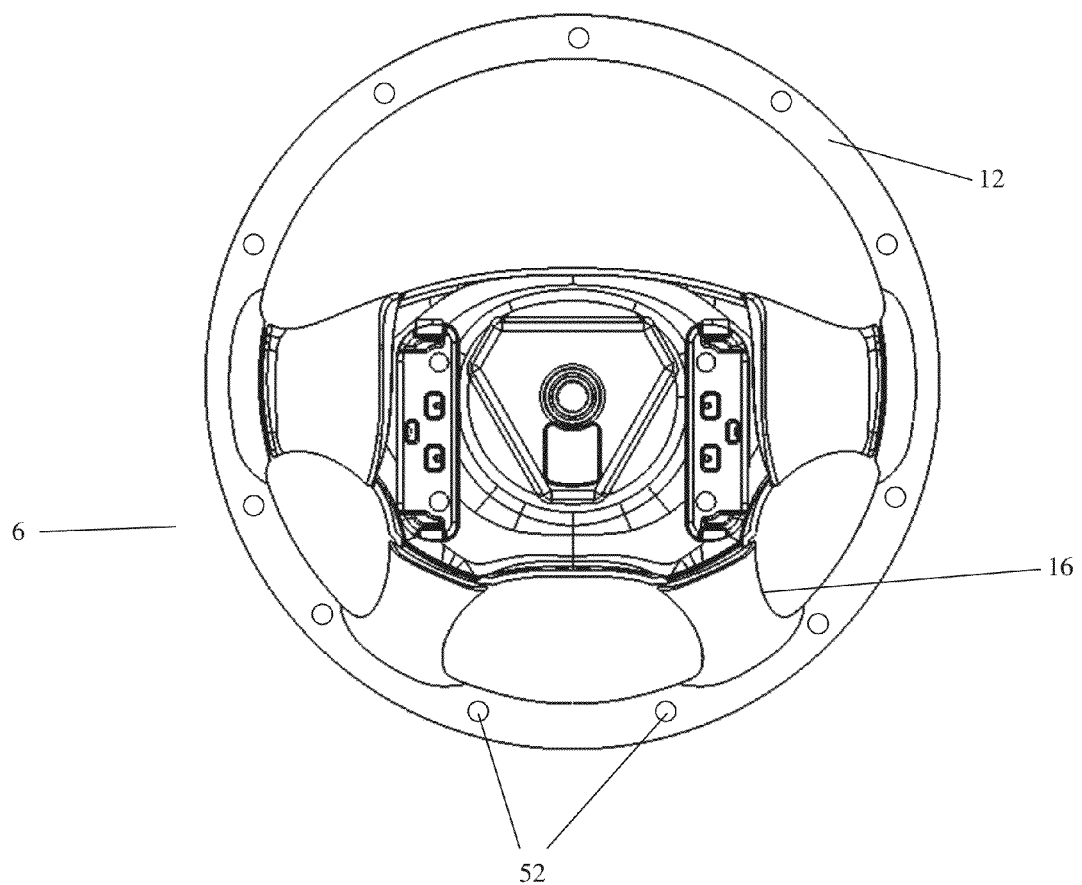
FIG. 5 is a front, schematic view of an embodiment of an armature comprising mechanical fasteners located around the rim for securing the top rim portion to the bottom rim portion.

Similarly, in addition to the adhesive, or alternatively, a plurality of mechanical fasteners 52, such as a boss and screw combination, screws, pins, and so forth, can be employed to further strengthen the assembly of armature 8, as shown in FIGS. 4 and 5. For example, FIG. 4 depicts an embodiment comprising the use of mechanical fasteners 52, e.g., boss and bore features for fastening. The fastening elements (e.g., a screw, pin, rivet, bolt, etc.) would be disposed through the boss 56. In the embodiment depicted in FIG. 4, a bore 54 (through hole) can be located on the top rim portion 12 through which a fastening element can be positioned into boss 56, which is located on the bottom rim portion 14. It will be appreciated that either rim portion 12, 14 can include bore 54 and the other rim portion thus include the boss 56.

FIG. 5 depicts an embodiment in which a plurality of spaced apart mechanical fasteners 52, as described above, are located around the entire rim 10 to facilitate assembly of armature 8. In FIG. 5, the fasteners 52 are spaced apart approximately 30 degrees from each other as measured radially from the center of the armature 10. However, other spacing of the fasteners 52 also can be employed, and the fasteners 52 can be located around only a portion of the rim 10.

Figure 6A:
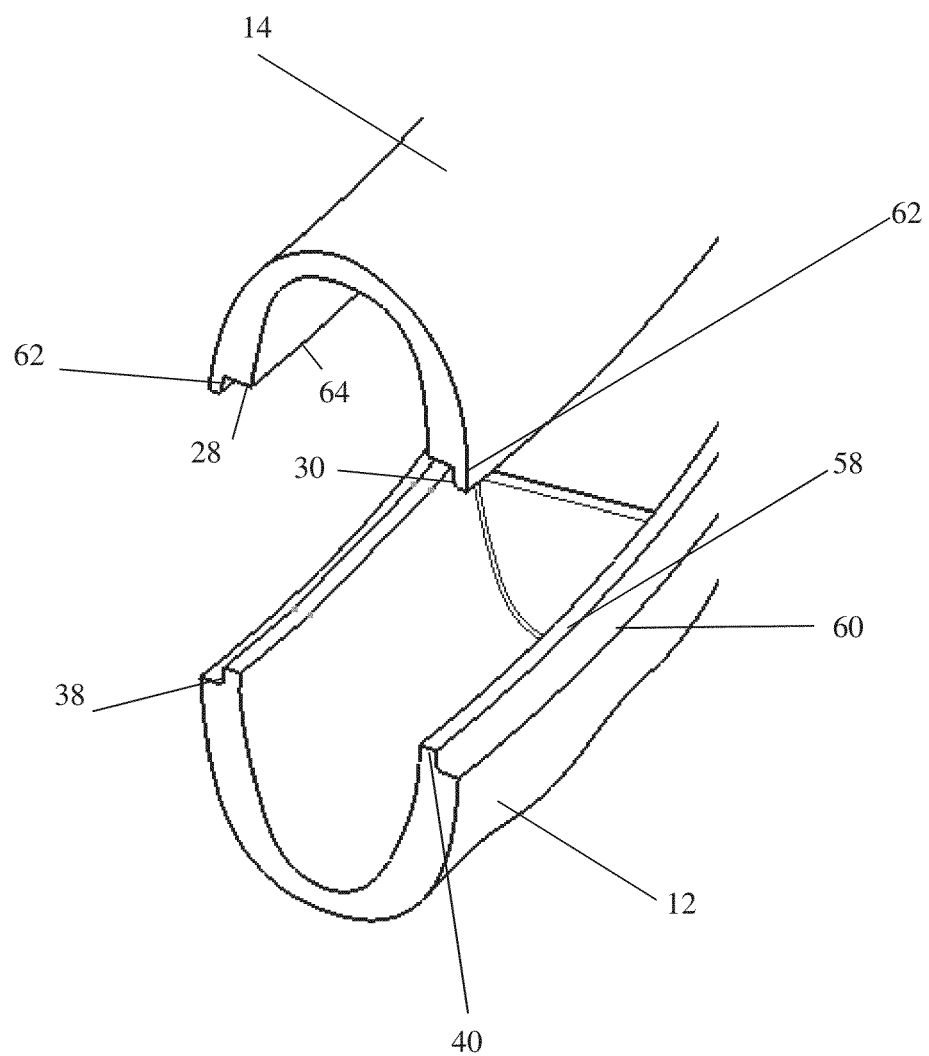
FIG. 6A is a perspective view of another embodiment of an armature depicting a portion of a top rim portion and a bottom rim portion unassembled yet aligned with each other at the grooves.
Figure 6B:
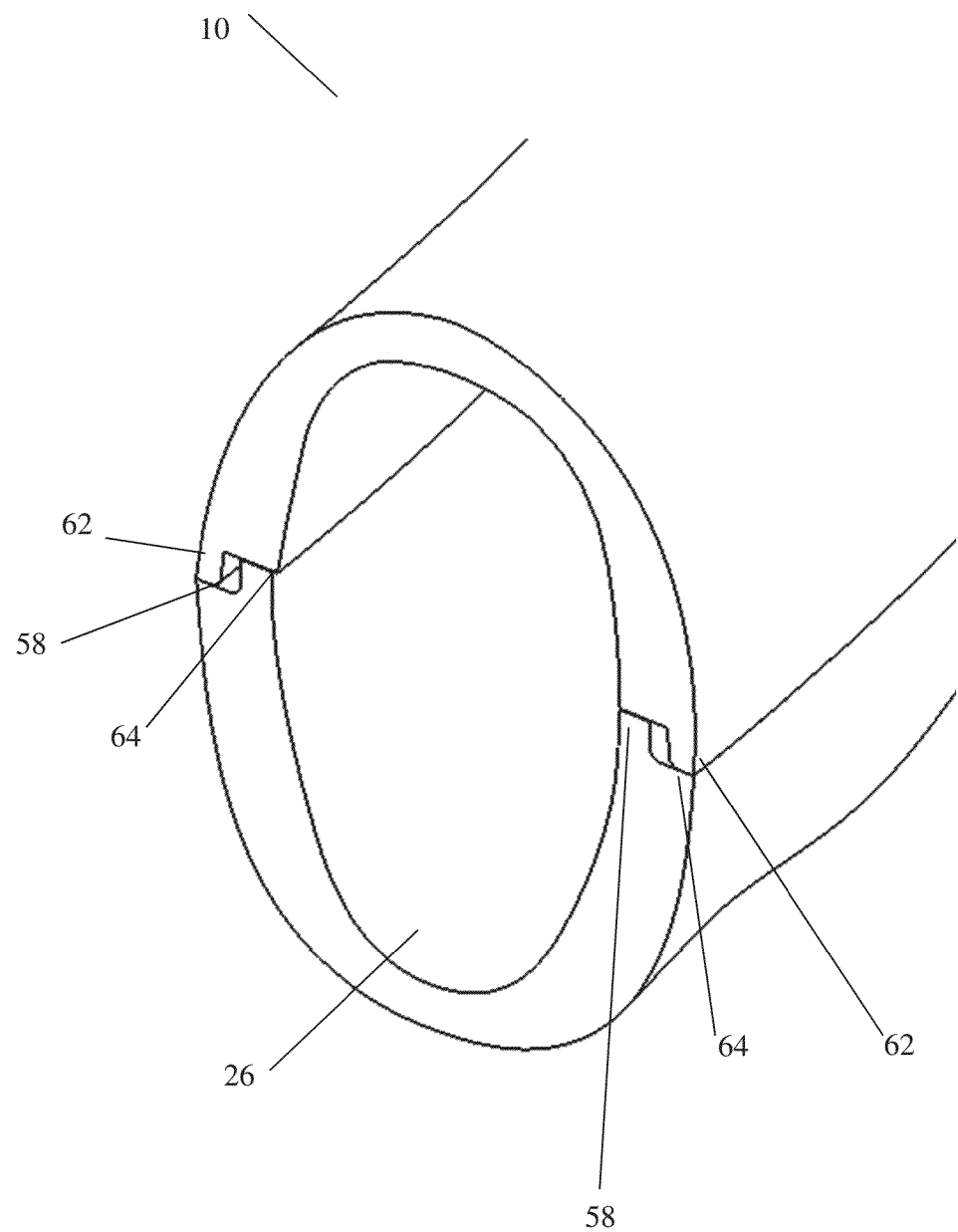
FIG. 6B is a perspective view of FIG. 6A in assembled form.

FIGS. 6A and 6B depict another configuration for rim 10. As shown therein, the first perimeter edge 38 and the second perimeter edge 40 of the bottom rim portion 14 can comprise a track 58 having an elongated edge 60 which can be located lower than the top of perimeter edges 38, 40. In other words, instead of a groove through the edge of the rim, the perimeter edges can have a protrusion and a ledge that mates with an opposite protrusion and ledge on the other rim portion. In the embodiment illustrated in FIGS. 6A and 6B, the inner surface of the bottom rim portion is taller than the outer surface of the bottom rim portion (forming the ledge at the outer surface of the bottom rim portion). The mating rim portion comprises a track and an extension, wherein the extension of one armature portion is received by the track of the other rim portion when assembled, wherein the track can be a groove or a ledge. For example, the top rim portion, can have an outer surface that is taller (overlapping portion (extension) 62) than the inner surface of the top rim portion (forming the ledge (track 64) at the inner surface of the top rim portion). Adhesive 50 can be deposited therein for securing rim portions 12, 14 together. Track 58 can extend around the entire length of the rim portion 14 or only at spaced apart locations, as desired.

FIG. 6B depicts the assembled rim 10 having this configuration. As can be seen from FIG. 6B, a secure mechanical joining mechanism can be achieved between the rim portions 12, 14, which can be further enhanced with the use of adhesive 50, as in groove 42. Optionally, track 64 also can be located on the external surface of the overlapping portion 62, as shown in FIG. 6B.

Figure 7A:
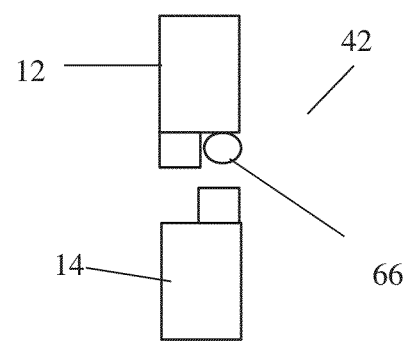
FIG. 7A is a schematic view of a portion of another armature embodiment comprising the use of a wire to melt and fuse the top armature portion to the bottom armature portion.
Figure 7B:
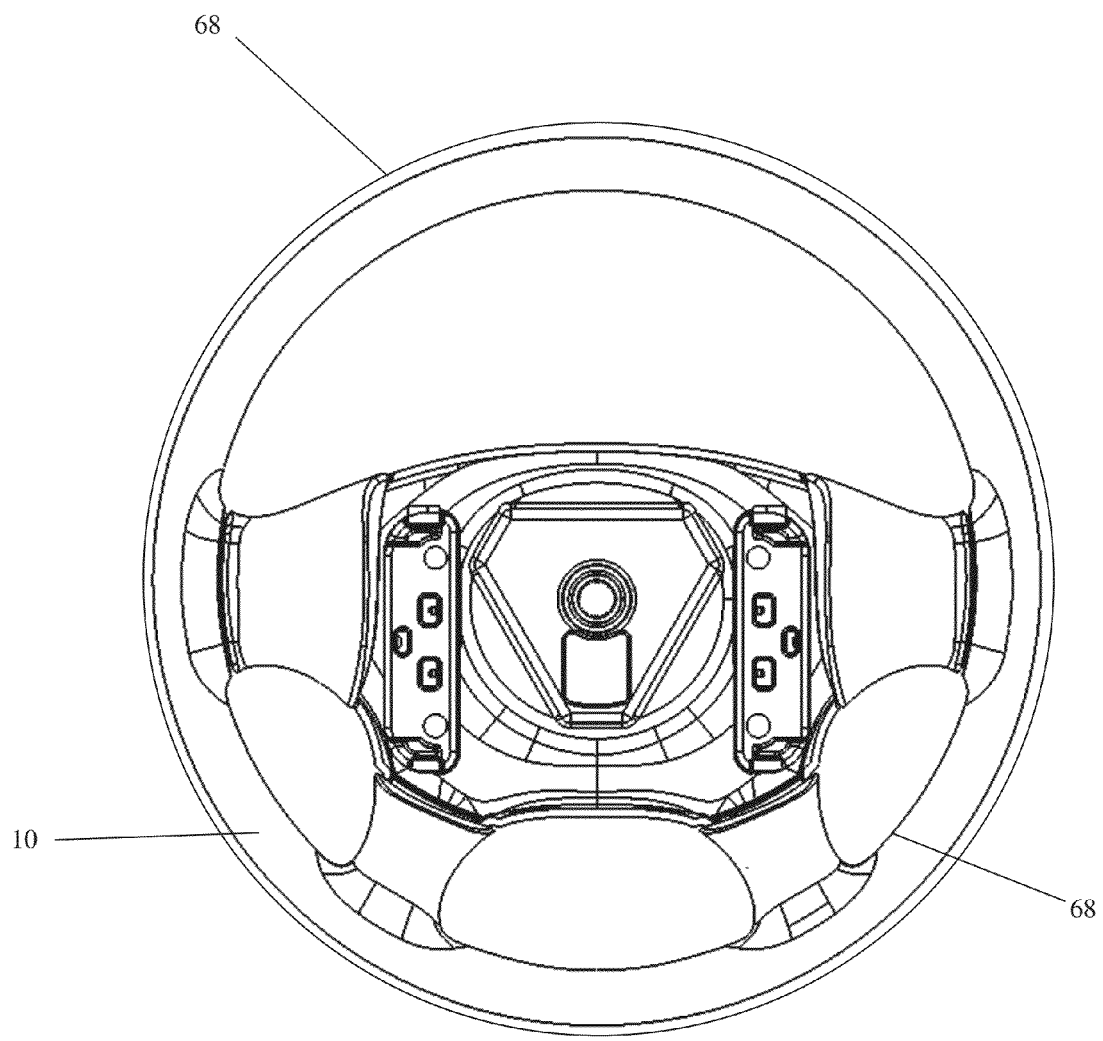
FIG. 7B is a front schematic view of the armature of FIG. 7A including induction coil heaters located around the armature.

FIGS. 7A and 7B depict an embodiment comprising the use of induction welding alternatively, or in addition to, the other embodiments described herein. As shown in FIG. 7A, a wire (e.g., galvanized iron (GI) wire) 66 can be located in the track 58 and/or 64 (or groove 42), and the rim 10 can be assembled together. Upon heating with the use of, for example, an induction coil heater 68 positioned around the rim 10, as shown for example in FIG. 7B, the wire 66 can melt and fuse the top rim portion 12 and bottom rim portion 14 together. For example, current can be applied through the induction coils, generating heat, melting the GI wire, and fusing the plastic together. Optionally, the top rim portion 12 and the bottom rim portion 14 can be held in a fixture, wherein pressure can be applied simultaneously with the applied current. The melt bonding of the portions together forms an armature that cannot be disassembled, i.e., the top armature portion cannot be separated from the bottom armature portion without damaging one or both portions.

FIG. 8 depicts an embodiment of joining bottom armature portion 4 to the top armature portion 6, which can employ any combination of the afore-described joining techniques, and which includes the use of a metal insert 70, e.g., steel. Metal insert 70 can provide further structural support to armature 8. More particularly, metal insert 70 can comprise a bore 72 and be positioned over a bore 76 of the hub 22 and aligned therewith. FIG. 8 depicts the metal insert 70 as having a triangular, square, or circular shape, however, it will be appreciated that other shapes and various sizes are possible. Metal insert 70 can provide the needed structural integrity to attach the armature 8 to a steering column (not shown). As shown in FIG. 8, as well as in FIG. 1, the hub 22 can also comprise various protrusions 74 and/or bores (openings) 76 which can aid in the manufacture and assembly of a steering wheel from armature 8, including other components, such as an airbag, horn, electronics (e.g., controls for the radio, cruise control, and so forth).

Figure 9:
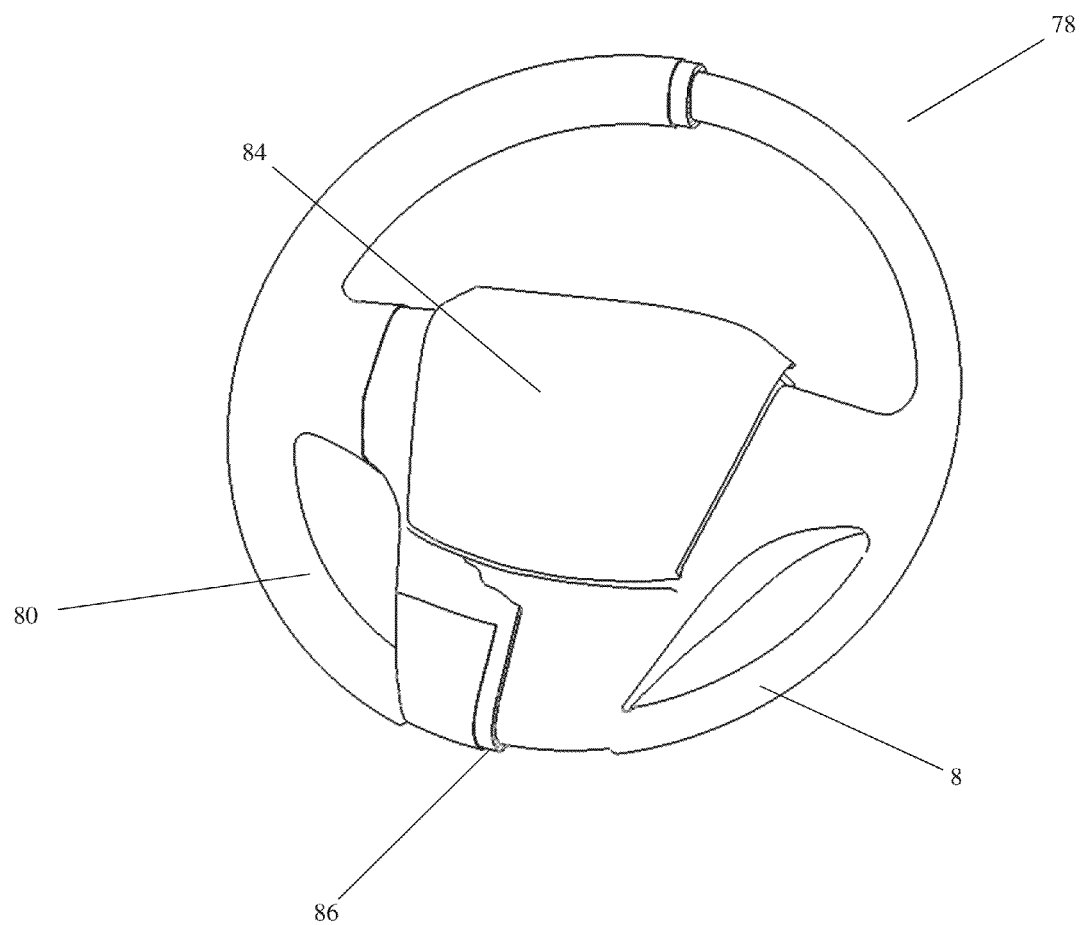
FIG. 9 is a partial cutaway, front perspective view of an embodiment of a steering wheel.

FIG. 9 depicts an example of a resultant steering wheel 78 comprising armature 8. It is noted that the armature 8 can be made with the use of manufacturing techniques including injection molding (e.g., gas assisted injection molding, water assisted injection molding, etc.). The armature 8 can comprise a plastic, e.g., thermoplastic, thermoset, and combinations comprising at least one of the foregoing. Depending upon the particular use (e.g., passenger vehicle, commercial equipment (farm equipment, construction equipment, etc.), and so forth), such as any thermoplastic that is deformable and absorbs energy during an impact event. Specifically, examples of possible plastics include a desired strain to failure rating (e.g., for passenger vehicles, those having a greater than or equal to 20 percent strain to failure rating as measured by tensile testing in accordance with ASTM D-638; e.g., for construction vehicles, those having a greater than or equal to 2 percent strain to failure rating as measured by tensile testing in accordance with ASTM D-638), and/or having elastic deformation at low loads and plastic deformation at high loads, wherein low loads are characterized as those encountered during normal operation of a steering wheel, and high loads are characterized as severe abuse or impact events as defined under Federal Motor Vehicle Safety Standard 203.

Examples of possible plastics include poly(arylene ether) resins, polyimides (e.g., polyamideimides, polyetherimides), polysulfones (e.g., polyether sulfones, polyaryl ether sulfones, polyphenylene ether sulfones), nylon, polyester, acrylonitrile-butadiene-styrene (ABS), polycarbonate (e.g., LEXAN* resin commercially available from SABIC Innovative Plastics), phenylene ether resins, polyphenylene oxide, polyamides, phenylene sulfide resins, polyvinyl chloride PVC, high impact polystyrene (HIPS), olefins (e.g., thermoplastic olefins (TPO), low/high density polyethylene, polypropylene), and foamed materials thereof, as well as combinations comprising at least one of the foregoing, such as polycarbonate/ABS blend, a copolycarbonate-polyester, acrylic-styrene-acrylonitrile (ASA), acrylonitrile-(ethylene-polypropylene diamine modified)-styrene (AES), polyphenylene ether-polystyrene, and silicone modified polycarbonate, commercially available from the SABIC Innovative Plastics under the trademark LEXAN* EXL (e.g., LEXAN* EXL 4016H, a glass fiber reinforced polycarbonate-siloxane copolymer). It is noted that, according to embodiments, the armature 8 and/or steering wheel 78 can be all plastic (e.g., thermoplastic, thermoset, or a combination comprising at least one of the foregoing). In some embodiments, the hub 22 with a bush (e.g., areas that attach the steering wheel to the steering column) also can comprise a combination of plastic and other materials, such as metal, with a metal insert.

In addition to the plastic, the plastic can include various additives, fillers, reinforcing agents, ordinarily incorporated into polymer compositions of this type. Exemplary additives include impact modifiers, fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. The total amount of additives (other than any impact modifier, filler, or reinforcing agents) is generally 0.01 to 5 wt %, based on the total weight of the composition.

Possible fillers or reinforcing agents include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates), talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well combinations comprising at least one of the foregoing fillers or reinforcing agents. The fillers and reinforcing agents can be in the form of particles, spheres, a mat (woven or nonwoven), fibers, coated with a layer of metallic material to facilitate conductivity, or surface treated with silanes to improve adhesion and dispersion with the polymeric matrix resin. Fillers are used in amounts of 1 to 200 parts by weight, based on 100 parts by weight, based on 100 parts by weight of the total composition.

In addition, the plastic can further be combined with various additive(s), with the proviso that the additive(s) are selected so as to not significantly adversely affect the desired properties of the thermoplastic composition, in particular its mechanical, thermal, rheological, magnetic, processing, optical, acoustical and other relevant and critical properties. Combinations of additives can be used. Such additives can be mixed at a suitable time during the mixing of the components for forming the composition.

Steering wheel 78 depicted in FIG. 9 also can comprise a cover 80, e.g., a leather cover, a horn cover 84 and a softening material 86 located between the surface of the armature 8 and the cover 80 to further enhance the look and feel of the steering wheel 78. The softening material 86 can comprise, for example, foam such as polypropylene (PP) foam. The foam can comprise any of the above plastics that can be foamed and will retain the desired structural integrity once foamed. An example of possible foam includes conductive polyurethane foam with additives to make it thermally conductive or to make it thermally and electrically conductive. The foam also can be formed from silicon based and/or expanded polyethylene or expanded polystyrene.

Steering wheel 78 also can comprise an attachment member (not shown) embedded in the hub 22 through bore 76, the attachment member sized to connect to a steering column (not shown).

Embodiments will now be described with reference to the following non-limiting examples which were simulations.

EXAMPLE 1

In Example 1, the performance of a steering wheel was tested against the performance of a comparative, vibration welded steering wheel with no snap fit protrusions. More specifically, the comparative vibration welded steering wheel was made from the same materials, namely, Lexan* EXL 4016H. The comparative design included a top half and a bottom half having a weld bead design at the periphery of the steering wheel rim to aid vibration welding and securing of the top half to the bottom half.

In contrast, the snap fit steering wheel, comprised top and bottom halves assembled together with the use of snap fit protrusions 18 arranged in an alternate, counteracting manner Approximately twenty five snap locations (e.g., slots 24) with each snap location measuring approximately 20 mm in width was used in the simulation. In this example, only snaps (e.g., snap fit protrusions 18) were used and no adhesive.

Figure 10:
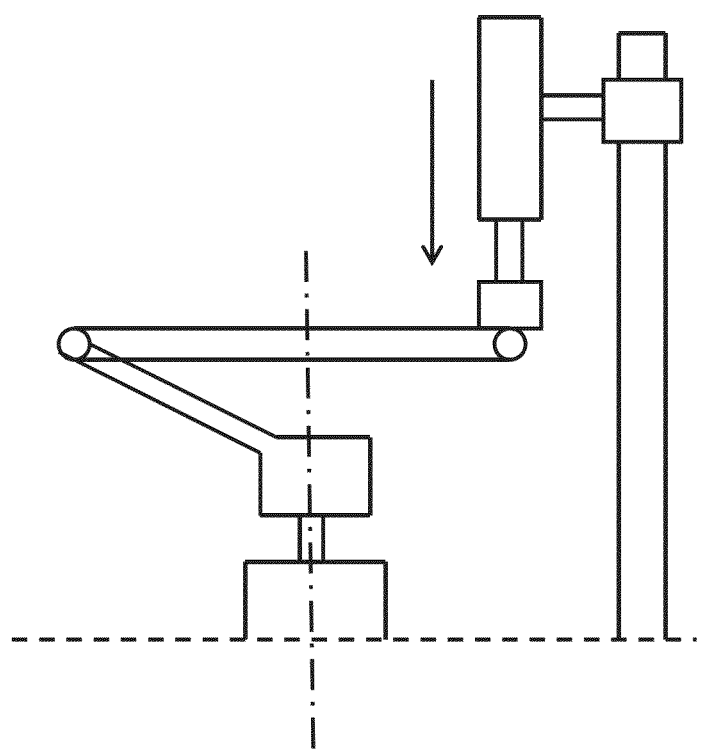
FIG. 10 is a schematic view of a 12 o'clock bending test referred to in Example 1.

A 12 o'clock bending test was simulated on both steering wheels. FIG. 10 depicts the 12 o'clock bending test set up. In this test, a force of 200 Newtons (N) was applied at the 12 o'clock region and the deflection should lie between the lower and upper spec curves of FIG. 11, described below. It is further noted that 12 o'clock bending tests are useful for the design of steering wheels because, for example, the point of 12 o'clock, as measured from the perspective of a vehicle operator represents a point of non-optimum strength, and typically the softest location on a steering wheel.

Figure 11:
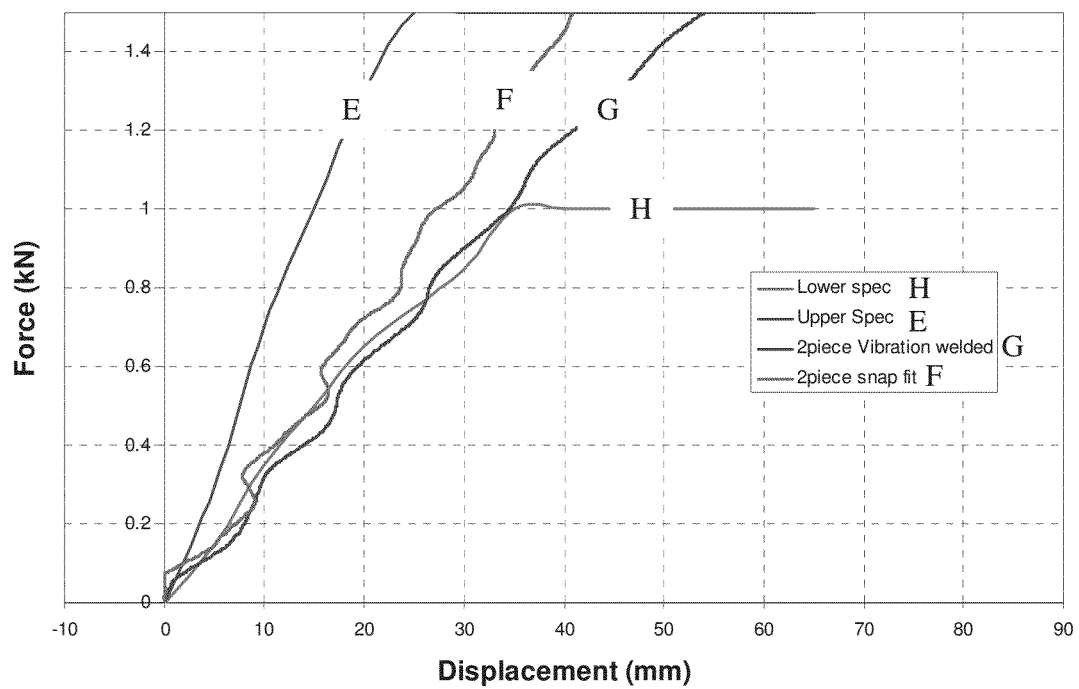
FIG. 11 is a graph of force (kiloNewtons (kN)) versus displacement (millimeters (mm)) referred to in Example 1.

FIG. 11 is a graph of force as measured in kiloNewtons (kN) versus displacement as measured in millimeters (mm) and depicts the results of this testing. As can be seen from the force displacement curves plotted therein, the force-deflection performance of the snap fitted steering wheel (line F) was within the upper specification (line E) and lower specification (line H) for most of the loading event. More specifically, as it can be observed from FIG. 11, the snap fit design provided better results when compared to the vibration welded design (line G) though both were within specification. Additionally, further testing has demonstrated that the proposed snap fit design can help eliminate the risk of cracking due to inconsistent weld strength which can occur with some vibration welded steering wheel designs.

EXAMPLE 2

In Example 2, a performance evaluation through simulation was conducted on an armature, including the counter acting snap design with and without an adhesive in comparison to a vibration welded sample (armature C). More particularly, armature A, did not include adhesive and comprised only snap fit protrusions 18 arranged in a spaced apart fashion along the perimeter of the rim in alternate fashion which counteracted with each other while assembled together. Armature B, included the features of armature A and also included the addition of adhesive bonding. More particularly, the design included a groove along the top and bottom half perimeter of the rim which can accommodate an adhesive. The type of adhesive can be, for example, epoxy, acrylic, and/or solvent based adhesives. Comparative vibration welded armature C comprised a weld area for melting and joining during the vibration welding process. Two conditions were considered: in condition 1 the weld strength was assumed to be 100% and in condition 2, the weld strength was assumed to be 50%.

In this performance evaluation, a 500 Newtons (N) load was applied at location 82 shown in FIG. 1. This load was applied by a block that constantly exerted pressure over a given area in the given direction until the maximum 500N load was applied. At the end of the load application, the displacement of the armature was recorded.

Figure 12:
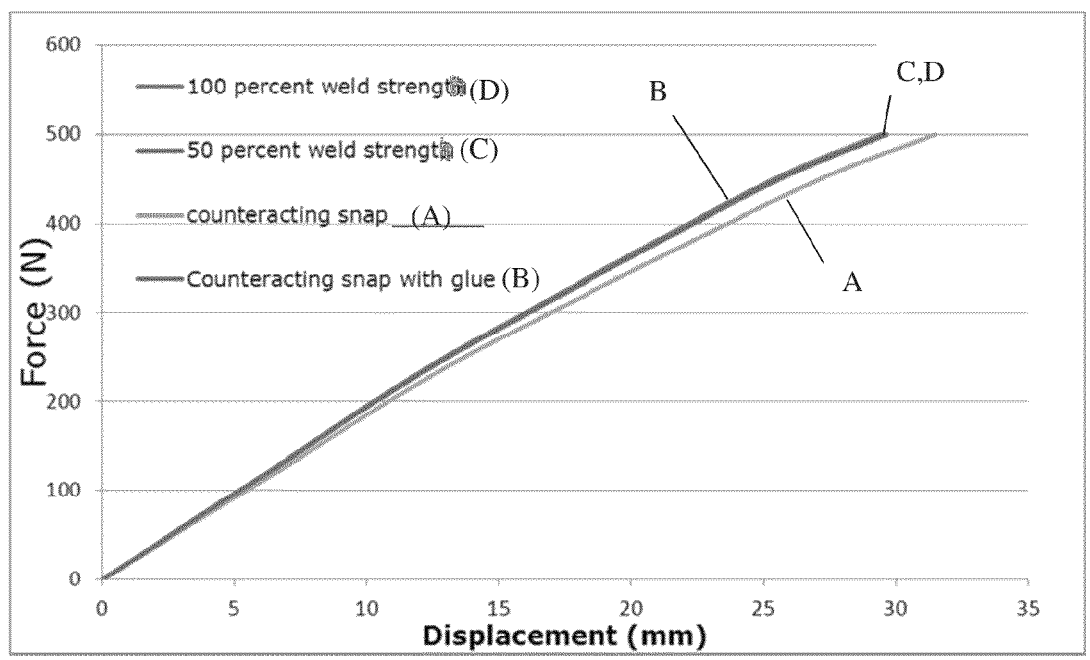
FIG. 12 is a graph of applied force (Newtons (N)) versus displacement (millimeters) referred to in Example 2.

The results of this testing is set forth in FIG. 12, which is a graph of applied force (N) versus displacement as measured in millimeters (mm) As can be seen from this graph, the design of armature A provides consistent bond strength due to a complete mechanical joint and provides comparable performance as of a vibration welded part. The inconsistency of welding is advantageously eliminated. The addition of adhesive to the design, as in armature B, further enhanced the performance and helped to match the performance of a vibration welded part. Comparative armature C represents vibration welded part assuming the weld strength to be 100% while armature D represents vibration welded part with an assumption of weld strength degrading to 50%. It can be understood that this effect may not be completely captured in simulation as evident from the observation that both the curves overlapped. However, it can be understood that this degradation of weld strength due to inconsistent welding can lead to crack during testing. It is further noted that the afore-described mechanical way of joining, helps to eliminate the risk of inconsistent welding associated with vibration welding due to, e.g., a pure mechanical way of joining using snaps; adhesive; mechanical fasteners; and/or any possible combination thereof. The number of snaps can vary according to the load as specified by the original equipment manufacturers and this can be determined the simulation to arrive at the optimum number to meet the deflection under specified load.

According to an embodiment, an armature comprises a top armature portion comprising a top rim portion and a top spoke portion, the top spoke portion extending radially inward from the top rim portion. The armature also comprises a bottom armature portion comprising a hub, a bottom rim portion and a bottom spoke portion, the bottom spoke portion extending radially inward from the bottom rim portion, which is spaced radially outward from and surrounds the hub. The top armature portion or the bottom armature portion comprises a plurality of snap fit protrusions spaced apart from each other and located on a perimeter edge of the rim portion and the other armature portion comprises a plurality of spaced apart slots configured to receive the plurality of snap fit protrusions and create a counter acting snapping mechanism which mechanically joins the top armature portion to the bottom armature portion upon assembly of the armature. The armature further comprises a plastic material.

According to another embodiment, an armature comprises a top armature portion comprising a top rim portion and a top spoke portion, the top spoke portion extending radially inward from the top rim portion. The armature also comprises a bottom armature portion comprising a hub, a bottom rim portion and a bottom spoke portion, the bottom spoke portion extending radially inward from the bottom rim portion, which is spaced radially outward from and surrounds the hub. The bottom rim portion comprises a first perimeter edge and a second perimeter edge each comprising a groove having an elongated edge lower than the first perimeter edge and the second perimeter edge. The top rim portion comprises a first perimeter edge configured to mate with the first perimeter edge of the bottom rim portion and a second perimeter edge configured to mate with the second perimeter edge of the top rim portion. The armature further comprises a plastic material.

According to a further embodiment, a method of making an armature comprises injection molding a top armature portion comprising a top rim portion and a top spoke portion, the top spoke portion extending radially inward from the top rim portion. The method also comprises injection molding a bottom armature portion comprising a hub, a bottom rim portion and a bottom spoke portion, the bottom spoke portion extending radially inward from the bottom rim portion, and the bottom rim portion spaced radially outward from and surrounding the hub, wherein the bottom rim portion has a perimeter edge comprising a groove. The method further comprises inserting a wire in the groove and heating the wire by induction welding to bond the top armature portion to the bottom armature portion.

In an embodiment, a steering wheel can comprise: a plastic top armature portion comprising a top rim portion and a top spoke portion, the top spoke portion extending radially inward from the top rim portion; and a plastic bottom armature portion comprising a hub, a bottom rim portion, and a bottom spoke portion, the bottom spoke portion extending radially inward to the hub. The top armature portion can be attached to the bottom armature portion with a plurality of snap mechanisms, wherein each snap mechanism comprises a snap fit protrusion that engages an aperture. The armature can be configured to attach to a vehicle steering column.

In an embodiment, a method of making an armature comprises: injection molding a plastic top armature portion comprising a top rim portion and a top spoke portion, the top spoke portion extending radially inward from the top rim portion; injection molding a plastic bottom armature portion comprising a hub, a bottom rim portion, and a bottom spoke portion, the bottom spoke portion extending radially inward from the bottom rim portion to the hub; and assembling the top rim portion and the bottom rim portion together with a plurality of snap mechanisms, wherein each snap mechanism comprises a snap fit protrusion that engages an aperture. The armature is configured to attach to a vehicle steering column via the hub.

In an embodiment, a method of making an armature comprises: injection molding a plastic top armature portion comprising a top rim portion and a top spoke portion, the top spoke portion extending radially inward from the top rim portion; injection molding a plastic bottom armature portion comprising a hub, a bottom rim portion, and a bottom spoke portion, the bottom spoke portion extending radially inward from the bottom rim portion to the hub; assembling the top rim portion and the bottom rim portion together with a wire between the top rim portion and the bottom rim portion, wherein the top armature portion is attached to the bottom armature portion with a plurality of snap mechanisms, wherein each snap mechanism comprises a snap fit protrusion that engages an aperture; and heating the wire to bond the top armature portion to the bottom armature portion. The armature is configured to attach to a vehicle steering column via the hub.

In the various embodiments, (i) the snap mechanisms are arranged around an inner side and an outer side in a staggered arrangement between the inner side and the outer side; and/or (ii) the snap mechanisms comprise an aperture in the top armature portion or the bottom armature portion, and a protrusion in the other of the top armature portion and the bottom armature portion, wherein the protrusion comprises an arm with a lip, wherein the lip is configured to extend into the aperture when the top armature portion and the bottom armature portion are assembled together; and/or (iii) the lip extends from the arm, through the aperture, and into a channel, engaging an inside of the top armature portion or the bottom armature portion; and/or (iv) the top rim portion and the bottom rim portion mate via an extension that mates with a track; and/or (v) the track forms a groove and wherein the extension extends into the groove when the top armature portion and the bottom armature portion are assembled together; and/or (vi) further comprising an adhesive in the groove which adhesively bonds the top armature portion and the bottom armature portion together; and/or (vii) further comprising an adhesive between the track and the extension which adhesively bonds the top armature portion and the bottom armature portion together; (viii) the top armature portion and the bottom armature portion each further comprise a strengthening element, wherein when the top armature portion and the bottom armature portion are assembled together, the strengthening element extends across a channel formed within the armature; and/or (ix) further comprising an additional snap mechanism on a set of strengthening elements, wherein when the top armature portion and the bottom armature portion are assembled together, the strengthening element extends across a channel formed within the armature and the additional snap mechanism further holds the top armature portion and the bottom armature portion together; and/or (x) further comprising a wire between the top armature portion that is melt bonded to the bottom armature portion such that the armature cannot be disassembled without damaging at least one of the top armature portion and the bottom armature portion; and/or (xi) the top armature portion comprises a thermoplastic material and the bottom armature portion consists of a thermoplastic material; and/or (xii) further comprising a plurality of spaced apart fasteners mechanically fastening the bottom armature portion and the top armature portion together, the fasteners selected from the group consisting of screws, pins, and a combination comprising at least one of the foregoing.

Also included herein is a vehicle comprising: a steering wheel attached to a steering column through a hub of the steering wheel, wherein the steering wheel comprises any of the above armatures. Optionally, a metal attachment member can attach the hub to the steering column.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A steering wheel, comprising:
   a plastic top armature portion comprising a top rim portion and a top spoke portion, the top spoke portion extending radially inward from the top rim portion; and
   a plastic bottom armature portion comprising a hub, a bottom rim portion, and a bottom spoke portion, the bottom spoke portion extending radially inward to the hub;
   wherein the top armature portion is attached to the bottom armature portion with a plurality of spaced apart snap mechanisms to form an armature,
   wherein the snap mechanisms comprise an aperture extending through a side in the top armature portion or the bottom armature portion, and a snap fit protrusion in the other of the top armature portion and the bottom armature portion, wherein the snap fit protrusion comprises an arm with a lip, the arm being of sufficient length to flex during assembly of the top armature portion and the bottom armature portion and to allow a locking arrangement;

wherein the lip is sized to extend into and through the aperture to contact another side of the top rim portion or the bottom rim portion when the top armature portion and the bottom armature portion are assembled together in the locking arrangement; and wherein the armature is to attach to a vehicle steering column.

2. The steering wheel of claim 1, wherein the snap mechanisms are arranged around an inner side and arranged around an outer side in a staggered arrangement between the inner side and the outer side.

3. The steering wheel of claim 1, wherein the lip extends from the arm, through the aperture, and into a channel, engaging an inside of the top armature portion or the bottom armature portion.

4. The steering wheel of claim 1, wherein the top rim portion and the bottom rim portion mate via an extension that mates with a track.

5. The steering wheel of claim 4, further comprising an adhesive between the track and the extension which adhesively bonds the top armature portion and the bottom armature portion together.

6. The steering wheel of claim 4, wherein the track forms a groove and wherein the extension extends into the groove when the top armature portion and the bottom armature portion are assembled together.

7. The steering wheel of claim 6, further comprising an adhesive in the groove which adhesively bonds the top armature portion and the bottom armature portion together.

8. The steering wheel of claim 1, wherein the top armature portion and the bottom armature portion each further comprise a strengthening element, wherein when the top armature portion and the bottom armature portion are assembled together, the strengthening element extends across a channel formed within the armature.

9. The steering wheel of claim 1, further comprising an additional snap mechanism on a set of strengthening elements, wherein when the top armature portion and the bottom armature portion are assembled together, the strengthening element extends across a channel formed within the armature and the additional snap mechanism further holds the top armature portion and the bottom armature portion together.

10. The steering wheel of claim 1, further comprising a wire between the top armature portion that is melt bonded to the bottom armature portion such that the armature cannot be disassembled without damaging at least one of the top armature portion and the bottom armature portion.

11. The steering wheel of claim 1, wherein the top armature portion comprises a thermoplastic material and the bottom armature portion consists of a thermoplastic material.

12. The steering wheel of claim 1, further comprising a plurality of spaced apart fasteners mechanically fastening the bottom armature portion and the top armature portion together, the fasteners selected from the group consisting of screws, pins, and a combination comprising at least one of the foregoing.

13. A vehicle, comprising a steering wheel attached to a steering column through a hub of the steering wheel, wherein the steering wheel comprises the armature of claim 1.

14. The vehicle of claim 13, wherein the snap mechanisms are arranged around an inner side and an outer side in a staggered arrangement between the inner side and the outer side.

15. The vehicle of claim 13, wherein the lip extends from the arm, through the aperture, and into a channel, engaging an inside of the top armature portion or the bottom armature portion.

16. The vehicle of claim 13, wherein a metal attachment member attaches the hub to the steering column.

17. A steering wheel, comprising:
a plastic top armature portion comprising a top rim portion and a top spoke portion, the top spoke portion extending radially inward from the top rim portion; and
a plastic bottom armature portion comprising a hub, a bottom rim portion, and a bottom spoke portion, the bottom spoke portion extending radially inward to the hub; wherein the top armature portion is attached to the bottom armature portion with a plurality of snap mechanisms to form an armature, wherein each snap mechanism comprises a snap fit protrusion that engages an aperture, and
an additional snap mechanism on a set of strengthening elements, wherein when the top armature portion and the bottom armature portion are assembled together, the strengthening element extends across a channel formed within the armature and the additional snap mechanism further holds the top armature portion and the bottom armature portion together; and
wherein the armature is to attach to a vehicle steering column.

18. A vehicle, comprising a steering wheel attached to a steering column through a hub of the steering wheel, wherein the steering wheel comprises the armature of claim 17.

19. The vehicle of claim 18, wherein the snap mechanisms are arranged around an inner side and arranged around an outer side in a staggered arrangement between the inner side and the outer side.

* * * * *